United States Patent
Sasaki et al.

(10) Patent No.: US 9,993,997 B2
(45) Date of Patent: Jun. 12, 2018

(54) LAMINATE AND PROCESS FOR PRODUCING SAME

(71) Applicant: MITSUBISHI CABLE INDUSTRIES, LTD., Tokyo (JP)

(72) Inventors: Taishiro Sasaki, Hyogo (JP); Masanori Fujii, Hyogo (JP); Hironori Oida, Wakayama (JP); Nobukazu Fujii, Wakayama (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 258 days.

(21) Appl. No.: 14/770,211

(22) PCT Filed: Feb. 26, 2014

(86) PCT No.: PCT/JP2014/054666
§ 371 (c)(1),
(2) Date: Aug. 25, 2015

(87) PCT Pub. No.: WO2014/132997
PCT Pub. Date: Sep. 4, 2014

(65) Prior Publication Data
US 2016/0001523 A1  Jan. 7, 2016

(30) Foreign Application Priority Data
Feb. 27, 2013 (JP) .................. 2013-037910

(51) Int. Cl.
| | |
|---|---|
| B32B 15/06 | (2006.01) |
| C09J 5/06 | (2006.01) |
| C09J 161/06 | (2006.01) |
| B32B 7/12 | (2006.01) |
| B32B 25/14 | (2006.01) |
| C09J 11/06 | (2006.01) |

(52) U.S. Cl.
CPC ............... *B32B 15/06* (2013.01); *B32B 7/12* (2013.01); *B32B 25/14* (2013.01); *C09J 5/06* (2013.01); *C09J 161/06* (2013.01); *B32B 2255/06* (2013.01); *B32B 2255/26* (2013.01); *B32B 2307/536* (2013.01); *B32B 2307/54* (2013.01); *B32B 2307/7242* (2013.01); *B32B 2307/7265* (2013.01); *B32B 2581/00* (2013.01); *C09J 2400/163* (2013.01); *C09J 2409/00* (2013.01); *C09J 2461/00* (2013.01)

(58) Field of Classification Search
CPC ...................................................... B32B 15/06
USPC ............................................................ 428/460
See application file for complete search history.

(56) References Cited

U.S. PATENT DOCUMENTS

2010/0190018 A1  7/2010  Higashira et al.

FOREIGN PATENT DOCUMENTS

| | | |
|---|---|---|
| CN | 102666091 | 9/2012 |
| EP | 2 174 723 | 4/2010 |
| EP | 2 500 168 | 9/2012 |
| JP | 11-221875 | 8/1999 |
| JP | 2002-004062 | 1/2002 |
| JP | 2002-220490 | 8/2002 |
| JP | 2003-261850 | 9/2003 |
| JP | 2003-334885 | 11/2003 |
| JP | 2007-083733 | 4/2007 |

OTHER PUBLICATIONS

Supplementary European Search Report dated Oct. 7, 2016 in corresponding European Application No. 14756485.0.
International Search Report dated Apr. 8, 2014 in International Application No. PCT/JP2014/054666.
Office Action dated Aug. 25, 2016 in corresponding Chinese Application No. 201480010764.7, with English translation.

*Primary Examiner* — Duc Truong
(74) *Attorney, Agent, or Firm* — Wenderoth, Lind & Ponack, L.L.P.

(57) ABSTRACT

The present invention provides a laminate having a high fluorohydrocarbon resistance even when used at a high temperature and suitable for use as a sealing member such as oil sealing, gasket and the like.
In a laminate including a metal member, and an adhesive and a hydrogenated nitrile rubber formed article laminated on the metal member, the adhesive is formed from a cured product of a composition containing a resin containing not less than 90 mass % of a novolac type phenol resin having a gelling time, as measured by Japanese Industrial standard (JIS) K 6910:2007 "gelling time C method", of 50 sec-150 sec at 150° C., and a curing agent.

9 Claims, No Drawings

LAMINATE AND PROCESS FOR PRODUCING SAME

TECHNICAL FIELD

The present invention relates to a laminate used for a sealing member such as oil seal, gasket and the like, which is used for a part to be in contact with fluorohydrocarbon, and a production method thereof.

BACKGROUND ART

Many sealing members such as oil seal, gasket and the like are used to seal refrigerant and freezing machine oil in cooling apparatuses such as refrigerator, freezing machine, air conditioning machine and the like, as well as compressor of air conditioning apparatus and the like. As such sealing member, a sealing member produced by adhering a metal member for a sealing member, which has been applied with an adhesive and baked, and a rubber preformed product using an uncrosslinked rubber composition for forming a sealing member, and forming the rubber preformed product into a rubber formed product is generally known.

As a metal member for the above-mentioned sealing member, a clasp formed from a cold rolled steel plate and the like and applied with a chemical film coating is used, and those treated with a zinc phosphate type film, a zinc calcium phosphate type film, an iron phosphate type film, a manganese phosphate type film and the like are disclosed (patent document 1).

Conventionally, fluorine rubber, nitrile rubber, ethylenepropylene rubber, a mixture of hydrogenated acrylonitrile-butadiene rubber and chlorinated polyethylene and the like have been used as rubber compositions for sealing members. However, there are problems in that rubber formed products using a fluorine rubber show insufficient fluorohydrocarbon resistance, rubber formed products using a nitrile rubber do not show heat resistance under an environment at 150° C., rubber formed products using a mixture of ethylenepropylene rubber or hydrogenated acrylonitrile-butadiene rubber and chlorinated polyethylene are inferior in oil resistance to freezing machine oil such as medicinal oil and the like.

Particularly, since fluorohydrocarbons such as HFC134a (1,1,1,2-tetrafluoroethane; $CH_2FCF_3$) and the like, which do not destroy the ozone layer, are used as refrigerants in an air conditioning machine and a freezing machine of vehicles and the like, a rubber formed product used for these sealing members is required to have, in addition to many features of being superior in hardness, elongation, tensile strength, heat resistance and oil resistance, and having small compression permanent strain, fluorohydrocarbon resistance which prevents easy development of crack and blister on contact with fluorohydrocarbon and the like.

In view of such demand, a composition for crosslinked adhesives, which contains a phenolxylylene resin or a phenolbiphenyl resin, a resol type phenol resin and/or a novolac type phenol resin, an uncrosslinked nitrile rubber and chlorinated polyethylene at a particular weight ratio is disclosed as a composition for crosslinked adhesives in consideration of fluorohydrocarbon resistance (patent document 2).

In recent years, however, to save the space of vehicle-mounted parts, an operating temperature of an air conditioning machine for vehicles has increased, and a sealing member such as oil seal, gasket and the like, which is used for a compressor and the like in an air conditioning machine of vehicles, is requested to have heat resistance of a level higher than that of conventional ones. Conventional sealing members have insufficient fluorohydrocarbon resistance when used at a high temperature.

DOCUMENT LIST

Patent Documents patent document 1: JP-A-2002-4062
patent document 2: JP-A-2003-261850

SUMMARY OF THE INVENTION

Problems to be Solved by the Invention

Therefore, an object of the present invention is to provide a laminate having a high fluorohydrocarbon resistance even when used at a high temperature and suitable for use as a sealing member such as oil sealing, gasket and the like.

Means of Solving the Problems

The present inventors have conducted intensive studies in an attempt to solve the aforementioned problems and found that, in a laminate wherein an adhesive and a hydrogenated nitrile rubber formed article are laminated on a metal member, stable adhesiveness is obtained in the interface between the adhesive and each of the metal member and the hydrogenated nitrile rubber formed article, and high fluorohydrocarbon resistance is obtained by forming the adhesive from a cured product of a composition containing a resin containing not less than 90 mass % of novolac type phenol resin having a gelling time, as measured by Japanese Industrial standard (JIS) K 6910:2007 "gelling time C method", of 50 sec-150 sec at 150° C., and a curing agent, which resulted in the completion of the present invention.

That is, the present invention relates to the following [1]-[12].

[1] A laminate comprising a metal member, and an adhesive and a hydrogenated nitrile rubber formed article laminated on the metal member, wherein the adhesive is formed from a cured product of a composition comprising a resin containing not less than 90 mass % of a novolac type phenol resin having a gelling time, as measured by Japanese Industrial standard (JIS) K 6910:2007 "gelling time C method", of 50 sec-150 sec at 150° C., and a curing agent.

[2] The laminate of the above-mentioned [1], wherein the novolac type phenol resin comprises not less than 80 mass % of a cresol modified novolac type phenol resin.

[3] The laminate of the above-mentioned [1] or [2], wherein the content of the curing agent is 5 parts by mass-30 parts by mass per 100 parts by mass of the novolac type phenol resin.

[4] The laminate of any of the above-mentioned [1]-[3], wherein the adhesive laminated on the metal member has a thickness of 1 μm-30 μm.

[5] The laminate of any of the above-mentioned [1]-[4], wherein the hydrogenated nitrile rubber formed article is a formed article of a rubber composition containing a hydrogenated nitrile rubber having a contained acrylonitrile amount of 30 mass %-45 mass %, an iodine value of 4 g/100 g-30 g/100 g, and Mooney viscosity [ML(1+4) 100° C.] of 70-150.

[6] A sealing member comprising the laminate of any of the above-mentioned [1]-[5].

[7] The sealing member of the above-mentioned [6], which is a gasket.
[8] The sealing member of the above-mentioned [6], which is an oil seal.
[9] The sealing member of any of the above-mentioned [6]-[8], which is used for an air conditioning machine or freezing machine for a vehicle.
[10] A production method of a laminate, comprising steps of dissolving a composition comprising a resin containing not less than 90 mass % of a novolac type phenol resin having a gelling time, as measured by Japanese Industrial standard (JIS) K 6910:2007 "gelling time C method", of 50 sec-150 sec at 150° C., and a curing agent in a solvent to give a coating liquid for preparing an adhesive, applying same to a metal member and heating same,
preforming a rubber composition containing a hydrogenated nitrile rubber, and
forming the aforementioned preformed rubber composition on the adhesive layer.
[11] The production method of the above-mentioned [10], comprising repeating plural times the step of applying the coating liquid for preparing the adhesive on a metal member and heating same.
[12] The production method of the above-mentioned [11], wherein, in the final step of applying the coating liquid for preparing an adhesive and heating same, the heating after coating is performed at a temperature from the melting point of the novolac type phenol resin to 150° C. and, in the other step of applying the coating liquid for preparing the adhesive and heating same, the heating after coating is performed at 130° C.-200° C.

Effect of the Invention

The laminate of the present invention shows superior fluorohydrocarbon resistance, and can retain extremely stable adhesiveness in each adhesive interface between a metal member and an adhesive, and between an adhesive and a hydrogenated nitrile rubber formed article. Therefore, it is particularly suitable for use as a sealing member such as oil seal, gasket and the like to be used at a harsh site and under harsh conditions (e.g., high temperature and the like) such as cooling apparatuses of air conditioning machines and freezing machines and compressor and the like of air conditioning apparatuses for vehicles such as automobile and the like.

DESCRIPTION OF EMBODIMENTS

The laminate of the present invention has a metal member, and an adhesive and a hydrogenated nitrile rubber formed article laminated on the metal member.
In the present invention, an adhesive to be laminated on a metal member to adhere a hydrogenated nitrile rubber formed article can be formed from a cured product of a composition comprising a resin containing not less than 90 mass % of a novolac type phenol resin having a gelling time, as measured by Japanese Industrial standard (JIS) K 6910: 2007 "gelling time C method", of 50 sec-150 sec at 150° C., and a curing agent.
The above-mentioned gelling time of the novolac type phenol resin is measured according to, in detail, "gelling time C method (automatic apparatus test tube method)" defined in JIS K 6910:2007 5.14.3, and the gelling time at 150° C. needs to be 50 sec-150 sec, preferably 55 sec-120 sec, more preferably 60 sec-100 sec, for the object of the present invention.

When the above-mentioned gelling time at 150° C. is less than 50 sec, gelling occurs in the early stages of heat hardening of the above-mentioned resin-containing composition and during the residence time in a metal mold for compression forming, which problematically causes the following defects.
That is, in the resin-containing composition showing progressed gelling, viscosity increases at an adhesion temperature and the composition does not easily adhere to an uncrosslinked rubber as an adherend, and the adhesiveness decreases. When the adhesiveness decreases markedly, the detachment in the rubber-adhesive interface easily occurs in a detaching test. Even when problem is not detected in a detaching test, minute adhesion fault may be developed, and such adhesion fault can be a starting point of blisters.
On the other hand, when the above-mentioned gelling time at 150° C. exceeds 150 sec, gelling starts late, which causes flow of the coating liquid for preparing an adhesive in the direction of gravitational force on the oil seal side during heat hardening, thus making the thickness of the adhesive layer in the flow part non-uniform. The adhesion between the adhesive and a hydrogenated nitrile rubber formed article becomes defective in a thin part of the adhesive layer, when the hydrogenated nitrile rubber preformed product is laminated, heated, and formed by pressure-forming and the like to give the hydrogenated nitrile rubber formed article. As a result, minute regions in the interface between the adhesive and the hydrogenated nitrile rubber formed article produce defects.
The above-mentioned gelling time is determined by the kind of novolac type phenol resin, degree of polymerization, the kind and content of the curing agent to be used, heating temperature, heating time and the like.
The novolac type phenol resin is obtained by condensation polymerization of phenols and formaldehyde in the presence of an acid catalyst.
In the present invention, a modified novolac type phenol resin such as cresol modified, alkylbenzene modified, isocyanate modified, thermoplastic resin modified, alkyl modified, nitrile rubber modified and the like, and one kind selected therefrom can be used singly, or two or more kinds thereof can be used in combination. Since the novolac type phenol resin shows good blister resistance when used in the form of an oil seal at a high temperature, the novolac type phenol resin in the present invention preferably contains not less than 80 mass %, more preferably not less than 90 mass %, further preferably 100 mass %, of a cresol modified novolac type phenol resin.
Moreover, for the object of the present invention, a novolac type phenol resin having a melting point, as measured by the capillary tube method defined in JIS K 6910: 2007 5.7, of 70° C.-120° C. is preferable, 75° C.-100° C. is more preferable, and 80° C.-90° C. is further preferable.
The novolac type phenol resin to be used in the present invention preferably shows a flow, as measured by the method A defined in JIS K 6910:2007 5.11.1, at 125° C. of 8 mm-50 mm, more preferably 10 mm-45 mm.
In the laminate of the present invention, a resin contained in the composition for forming an adhesive contains not less than 90 mass % of a novolac type phenol resin having the above-mentioned gelling time of 50 sec-150 sec. As long as the characteristics of the present invention are not impaired, a resin other than the above-mentioned novolac type phenol resin such as resol type phenol resin, chlorinated polyethylene, coumarone resin and the like can be contained. The content of the above-mentioned novolac type phenol resin in the resin is preferably not less than 95 mass %, more preferably 100 mass %.

As the novolac type phenol resin having the above-mentioned gelling time as measured by JIS K 6910:2007 "gelling time C method" at 150° C. of 50 sec-150 sec, a resin synthesized to afford such property by using phenols and formaldehyde may be used. The below-mentioned commercially available novolac type phenol resin product can be preferably used.

In the laminate of the present invention, the adhesive is formed from a cured product of a composition containing a resin containing not less than 90 mass % of a novolac type phenol resin having the above-mentioned gelling time of 50 sec-150 sec, and a curing agent.

In the present invention, a known curing agent used for curing a novolac type phenol resin can be used as a curing agent without any particular limitation, and examples thereof include hexamethylenediamine, hexamethylenetetramine and the like. The content of the curing agent is preferably 5 parts by mass-30 parts by mass, more preferably 5 parts by mass-15 parts by mass, further preferably 7 parts by mass-15 parts by mass, per 100 parts by mass of the novolac type phenol resin having the above-mentioned gelling time of 50 sec-150 sec. The content of the curing agent is preferably not less than 5 parts by mass since the strength and heat resistance of the adhesive coated film are fine. It is preferably not more than 30 parts by mass since the gelling time is sufficient for the object of the present invention.

The above-mentioned composition for forming an adhesive may further contain a curing aid. As a curing aid, a known curing aid used for curing novolac type phenol resins can be used without any particular limitation, and examples thereof include calcium hydroxide, magnesium oxide and the like. The content of the curing aid is generally not more than 1.0 part by mass, preferably not more than 0.5 parts by mass, more preferably not more than 0.1 part by mass, per 100 parts by mass of the novolac type phenol resin having the above-mentioned gelling time of 50 sec-150 sec. However, it is more preferable to not use a curing aid. When the content of the curing aid is not more than 1.0 part by mass, the fluorohydrocarbon resistance is particularly improved on the side surface of a sealing member.

In the laminate of the present invention, the composition for forming an adhesive may further contain other additive components such as uncrosslinked nitrile rubber and the like, as long as the characteristics of the present invention are not impaired. The content of the additive components is preferably not more than parts by mass, more preferably not more than 5 parts by mass, per 100 parts by mass of the novolac type phenol resin having the above-mentioned gelling time of 50 sec-150 sec.

To achieve the object of the present invention, a commercially available product can also be utilized as a composition containing a novolac type phenol resin having the above-mentioned gelling time of 50 sec-150 sec and a curing agent, or a composition further containing a curing aid and other additive components.

Examples of the commercially available product include "MR-550M", "MR-508" (manufactured by Meiwa Plastic Industries, Ltd.) and the like.

The adhesive in the laminate of the present invention is formed from a cured product of a composition containing a resin containing not less than 90 mass % of a novolac type phenol resin having the above-mentioned gelling time of 50 sec-150 sec, a curing agent, and a curing aid and other additive components as necessary. The cured product is obtained by curing the aforementioned composition by heating. In the present invention, a composition containing the aforementioned resin and a curing agent is preferably applied on a metal member and cured by heating, as mentioned below.

A metal member used for forming the laminate of the present invention is not particularly limited as long as it is generally used for a laminate provided as a sealing member such as oil seal, gasket and the like and, for example, a metal member obtained by appropriately processing a cold rolled steel plate or a soft steel plate by a metal press and the like into a shape and size suitable for the object, and further applying a surface treatment by, for example, chemical film coating and the like is used. While the above-mentioned chemical film coating is not particularly limited, for example, zinc phosphate type film coating, zinc calcium phosphate type film coating, manganese phosphate type film coating, iron phosphate type film coating and the like, which are widely used in the pertinent field, can be mentioned. Of these, zinc phosphate type film coating and zinc calcium phosphate type film coating are particularly preferable.

The surface of the side of a metal member which is adhered to an adhesive preferably has a maximum height roughness (Rz) of 1 μm-10 μm, as measured by a stylus type surface roughness measuring instrument according to JIS B 0633:2001.

As a hydrogenated nitrile rubber formed article that forms the laminate of the present invention, a hydrogenated nitrile rubber formed article superior in fluorohydrocarbon resistance, heat resistance and oil resistance, which is generally used in the pertinent technical field, is used. Examples of the hydrogenated nitrile rubber formed article include a formed article composed of a rubber formed product obtained by crosslinking and forming a rubber composition containing a hydrogenated nitrile rubber as a main component.

A hydrogenated nitrile rubber to be the main component preferably has a contained acrylonitrile amount of 30 mass %-45 mass % (more preferably 35 mass %-40 mass %), an iodine value of 4 g/100 g-30 g/100 g (more preferably 10 g/100 g-15 g/100 g), and Mooney viscosity [ML(1+4)100° C.] of 70-150 (more preferably 80-150, further preferably 100-150). A rubber formed article obtained by crosslinking and forming a rubber composition containing such hydrogenated nitrile rubber, carbon black, a plasticizer, a crosslinking agent, a crosslinking aid and the like as appropriate is particularly preferable.

In the present invention, as a hydrogenated nitrile rubber contained in a hydrogenated nitrile rubber formed article, one containing not less than 90 mass %, more preferably 100 mass %, of a hydrogenated nitrile rubber having the above-mentioned contained acrylonitrile amount, iodine value and Mooney viscosity is preferable.

The above-mentioned contained acrylonitrile amount and iodine value of the hydrogenated nitrile rubber are measured m according to the methods defined in JIS K 6384:2001 5. and JIS K 6235:2006, respectively, and the Mooney viscosity is measured according to the methods defined in JIS K 6300-1:2001 5.6 based on JIS K 6384:2001 4.1.

The content of a hydrogenated nitrile rubber in a rubber composition to prepare the above-mentioned rubber formed article is preferably 40 mass %-70 mass %, more preferably 45 mass %-65 mass %, relative to the total amount of the rubber composition.

As carbon black to be added to the above-mentioned rubber composition, various grades of carbon blacks generally used, such as MT carbon black, FT carbon black, SRF carbon black, FEF carbon black, HAF carbon black, ISAF carbon black and the like can be used without any particular limitation, with preference given to FEF carbon black, MT carbon black, and HAF carbon black.

Carbon black is preferably used in 40 parts by mass-120 parts by mass, more preferably 45 parts by mass-110 parts by mass, per 100 parts by mass of the hydrogenated nitrile rubber.

As a plasticizer to be added to the above-mentioned rubber composition, phthalate type plasticizers such as dibutylphthalate, dioctylphthalate and the like, sebacate type plasticizers such as dibutylsebacate, dioctylsebacate and the like, and trimellitate type plasticizers such as trioctyl trimellitate and the like are preferably used.

The above-mentioned plasticizer is preferably used in 0.5 parts by mass-10 parts by mass, more preferably 1 part by mass-5 parts by mass, per 100 parts by mass of the hydrogenated nitrile rubber.

As the crosslinking agent to be added to the above-mentioned rubber composition, organic peroxides such as benzoylperoxide, 1,1-bis(t-butylperoxy)-3,3,5-trimethylcyclohexane, 1,1-bis(t-butylperoxy)cyclododecane, n-butyl-4,4-bis(t-butylperoxy)valerate, dicumylperoxide, t-butylperoxybenzoate, di-t-butylperoxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, t-butylperoxycumene and the like are preferably used.

The above-mentioned crosslinking agent is preferably used in 1 part by mass-10 parts by mass, more preferably 2 parts by mass-5 parts by mass, per 100 parts by mass of the hydrogenated nitrile rubber.

Ordinary physical properties of a hydrogenated nitrile rubber formed article that forms the laminate of the present invention are shown below.

(1) Durometer Hardness (Type A)

The durometer hardness (type A) measured according to JIS K 6253:1997 is generally 70-90, preferably 75-85.

(2) Tensile Strength

The tensile strength measured according to JIS K 6251:2010 and using dumbbell No. 3 test piece is generally not less than 10 MPa, preferably not less than 20 MPa.

(3) Elongation at Break

The elongation at break measured according to JIS K 6251:2010 is generally not less than 120%, preferably not less than 150%.

In the present invention, an adhesive is laminated on a metal member by preferably applying a coating liquid for preparing an adhesive, and thermally curing the same.

As used herein, a coating liquid for preparing an adhesive is prepared by dissolving a composition containing a resin containing a novolac type phenol resin having the above-mentioned gelling time of 50 sec-150 sec, and a curing agent in a solvent. As a solvent, one or more kinds selected from the group consisting of methyl ethyl ketone, methoxypropanol and methanol are preferably used and, to improve leveling property of the coated film, a mixture of methyl ethyl ketone and methoxypropanol is more preferably used. The solid content concentration of the aforementioned coating liquid is preferably 3 mass %-20 mass %, more preferably 8 mass %-12 mass %. When the solid content concentration of the coating liquid is 3 mass %-20 mass %, it can be easily applied due to the low viscosity of the coating liquid, and a coated film having a sufficient thickness can be obtained even when the number of application operation is small.

A coating liquid for preparing an adhesive can be applied onto a surface of a metal member by coating with a tool generally used in the pertinent technical field, immersion in the coating liquid, spraying and the like.

The heating after applying a coating liquid for preparing an adhesive is preferably performed in an oven and the like at a temperature not less than the melting point of the above-mentioned resin component and not more than 150° C., more preferably 80° C.-145° C., further preferably 100° C.-140° C., particularly preferably 120° C.-135° C. A heating temperature of not less than the melting point of the above-mentioned resin component is preferable, since the coated film before curing is stable and flow during forming can be suppressed, and a heating temperature of not more than 150° C. is preferable, since the adhesive force does not decrease after curing and detachment from the metal member and the hydrogenated nitrile rubber formed article can be suppressed. The heating time is generally 3 min-60 min, preferably 5 min-30 min, more preferably 10 min-20 min.

The step of applying a coating liquid for preparing an adhesive on a metal member and heating same may be performed once, or repeated plural times, for example, 2-4 times. To obtain a uniform coated film having an appropriate thickness, the step is preferably repeated plural times.

When the step of applying a coating liquid for preparing an adhesive and heating same is repeated plural times, excluding the step to be performed last, the heating after applying a coating liquid for preparing an adhesive is preferably performed at 130° C.-200° C., more preferably 150° C.-170° C. When the heating temperature after applying a coating liquid for preparing an adhesive is not less than 130° C., the adhesive force of the adhesive is improved, and durability and adhesiveness of the base coated film are preferably improved. The aforementioned heating temperature of not more than 200° C. is preferable, since thermal degradation of the coated film does not occur.

In the final step of applying a coating liquid for preparing an adhesive and heating same, the heating after applying a coating liquid for preparing an adhesive is preferably performed at [melting point of novolac type phenol resin having the above-mentioned gelling time of 50 sec-150 sec] to 150° C., more preferably 120° C.-135° C. A heating temperature after applying a coating liquid for preparing an adhesive of not less than the melting point of the above-mentioned novolac type phenol resin is preferable, since the coated film before curing is stable and flow during forming can be suppressed. In addition, the aforementioned heating temperature of not more than 150° C. is preferable, since the adhesiveness does not decrease after curing and detachment from the metal member and the hydrogenated nitrile rubber formed article can be suppressed.

When the step of applying a coating liquid for preparing an adhesive onto a metal member and heating same is repeated plural times, the heating in each step is preferably performed for 3 min-60 min, more preferably 10 min-20 min. A heating time of not less than 3 min is preferable since the stability of the coated film increases after heating. A heating time of not more than 60 min is preferable since the adhesiveness becomes more stable after heating.

Excluding the final step, the heating after applying a coating liquid for preparing an adhesive is preferably performed at 130° C.-200° C. for 3 min-60 min, more preferably 150° C.-170° C. for 10 min-20 min.

The heating after applying a coating liquid for preparing an adhesive in the final step is preferably performed at [melting point of novolac type phenol resin having the above-mentioned gelling time of 50 sec-150 sec] to 150° C. for 3 min-60 min, more preferably 120° C.-135° C. for 10 min-20 min.

A hydrogenated nitrile rubber formed article is formed on an adhesive laminated on a metal member. In the laminate of the present invention, the above-mentioned rubber composition containing a hydrogenated nitrile rubber is kneaded using a kneading machine such as intermixture, kneader, Banbury mixer and the like or an open roll and the like, and preforming is performed using an apparatus generally used in the pertinent field such as extruder, open roll, preformer and the like. The shape, size and the like of the preformed product are appropriately adjusted according to the final shape, size and the like of the hydrogenated nitrile rubber formed article.

The above-mentioned preformed product is simultaneously subjected to crosslinking and adhesion onto the above-mentioned adhesive layer and formed into a desired shape to give the laminate of the present invention. Crosslinking and forming of the preformed product is performed by heating in an injection molding machine, a compression molding machine, a pressurization press and the like at 150° C.-200° C. for about 2 min-30 min. After the crosslinking and adhesion, secondary crosslinking may be performed. The secondary crosslinking is performed by heating in an oven and the like at 120° C.-170° C. for about 1 hr-24 hr. A laminate obtained by such secondary crosslinking is preferable since fluorohydrocarbon resistance is improved more.

While the thickness of the adhesive layer in the laminate of the present invention is not particularly limited, it is preferably 1 μm-30 82 m, more preferably 10 μm-20 μm. A thickness of the adhesive layer of not less than 1 μm is preferable since the adhesiveness between adhesive-hydrogenated nitrile rubber formed articles becomes stable, and not more than 30 μm is preferable since adhesiveness between adhesive-metal members becomes stable.

In the present invention, the "thickness of adhesive layer" refers to a thickness of the adhesive coated film after applying a coating liquid for preparing an adhesive followed by a heat treatment, and before lamination of a hydrogenated nitrile rubber composition.

The thickness of the adhesive layer is calculated from the following formula (1) and using "minimum value ($d_{min}$) of optical path difference between reflected light on substrate surface and reflected light on adhesive layer surface" measured using a measuring apparatus based on the optical interferometry as the measurement principle by irradiating light from the adhesive layer side of the sample, and "refractive index (n) of adhesive layer". The refractive index (n) of the adhesive layer is measured according to JIS K 0062 and using a sodium lamp as a light source.

[number 1]

$$\text{thickness of adhesive layer} = d_{avr}/2n \quad (1)$$

$d_{avr}$: average value of $d_{min}$ by 3 times of measurement

The "thickness of adhesive layer" may be measured by laminating an adhesive and a hydrogenated nitrile rubber formed article on a metal member, cutting the laminate to produce a section permitting the measurement of the thickness of the adhesive layer, grinding the cutting surface and measuring same with a magnifying lens.

The laminate of the present invention has the following properties.

(1) The laminate of the present invention shows highly stable adhesiveness between adhesive-hydrogenated nitrile rubber formed article and adhesive-metal member. That is, (i) After a fluorohydrocarbon resistance test, a hydrogenated nitrile rubber formed article is detached in a 90° detaching test, and the metal member surface has a hydrogenated nitrile rubber residual ratio of not less than 95%.

(ii) After a fluorohydrocarbon resistance test, a hydrogenated nitrile rubber formed article is detached, the hydrogenated nitrile rubber formed article remaining on the metal member surface is subjected to a picking test with a nipper, and the ratio of the area of the hydrogenated nitrile rubber formed article remaining unpicked to the surface area of the metal member is not less than 95%.

Therefore, fluorohydrocarbon resistance is fine as compared to conventional laminates.

(2) The laminate of the present invention shows superior fluorohydrocarbon resistance. That is, (i) when a plate test piece is formed from the laminate of the present invention, and the test piece is subjected to a fluorohydrocarbon resistance test, the total number of blisters or cracks developed from near the interface of the adhesive as a point of origin is not more than 2 per 1250 mm$^2$, (ii) when a oil seal test piece is formed from the laminate of the present invention, and the test piece is subjected to a fluorohydrocarbon resistance test, the total number of blisters or cracks developed on the top face and lateral face of the oil seal from near the interface of the adhesive as a point of origin is not more than 5 per 650 mm$^2$, When a conventional laminate in the form of an oil seal is subjected to a fluorohydrocarbon resistance test, many blisters and cracks tend to be developed particularly from the interface of the adhesive on the lateral face of the oil seal. Since the development of such blisters and cracks can be suppressed, the laminate of the present invention is superior to conventional laminates in the fluorohydrocarbon resistance.

Therefore, the laminate of the present invention shows resistance, which is superior to conventional levels, to various fluorocarbon type refrigerants used as refrigerants of, in particular, cooling apparatuses and air conditioning apparatuses, for example, fluorohydrocarbons such as HFC32 (difluoromethane; $CH_2F_2$), HFC125 (1,1,1,2,2-pentafluoroethane; $CHF_2CF_3$), HFC143a (1,1,1-trifluoroethane; $C_2H_3F_3$), HFC134a (1,1,1,2-tetrafluoroethane; $CH_2FCF_3$) and the like and a mixture of these.

While the shape and structure of the laminate of the present invention are not particularly limited, the laminate is useful as a sealing member such as oil sealing, gasket and the like. As mentioned above, the laminate of the present invention is particularly superior in fluorohydrocarbon resistance, and can maintain extremely stable adhesiveness in the adhesion interface between a metal member and an adhesive. Therefore, the laminate of the present invention is preferably utilized as a sealing member such as oil seal, gasket and the like, which is used for the shaft of air conditioning machines and freezing machines for vehicles such as automobile and the like, for which a more harsh use atmosphere than conventional use is assumed such as use at high temperature and the like.

EXAMPLES

While the present invention is explained in further detail by referring to Examples, the present invention is not limited by these Examples.

The composition for forming an adhesive shown in Table 1 was dissolved in a solvent (methyl ethyl ketone:methoxypropanol=62:30 (mass ratio)) at solid content concentration=8 mass % to give a coating liquid for preparing an adhesive, and the aforementioned coating liquid was applied onto the following plate metal member or metal member for oil seal at about 8.0 mg per 10 mm$^2$ of the metal member. The aforementioned application and heat treatment at 165° C. for 15 min were repeated the number of times shown in Table 1, and lastly, the heat treatment under the conditions shown in Table 1 was performed. The hydrogenated nitrile rubber composition shown in Table 1 in an amount corresponding to about 200 g of the content of the hydrogenated nitrile rubber was kneaded in an open roll, a preformed product in the form of a 2 mm-thick sheet was laminated, and the laminate was compression-formed by a pressurization press at 175° C. for min to give each of the laminates of the Examples and Comparative Examples, wherein a rubber formed article (thickness about 1 mm) composed of each of the crosslinked hydrogenated nitrile rubber compositions mentioned above was laminated.

Using a measuring apparatus shown below, $d_{min}$ was measured under the following conditions, the thickness of the adhesive coated film before lamination of the hydrogenated nitrile rubber composition was calculated from the above-mentioned formula (1) and also shown in Table 1 as the thickness of the adhesive layer.

(1) apparatus name: non-contact surface-layer cross sectional shape measuring system VertScan 2.0 (manufactured by Ryoka Systems Inc.) (see: http://www.rsi.co.jp/kagaku/ip/vertscan20/principles.html)
(2) measurement condition:
objective lens; ×10 (optical resolution 0.9 μm)
wavelength of irradiation light; 530 nm
scan mode; line scan
scan length; 500 μm

TABLE 1

|  |  | Example | | | | | | |
|---|---|---|---|---|---|---|---|---|
|  |  | 1 | 2 | 3 | 4 | 5 | 6 | 7 |
|  | hydrogenated nitrile rubber composition 1 | ◯ | ◯ | ◯ | ◯ | ◯ | ◯ |  |
|  | hydrogenated nitrile rubber composition 2 |  |  |  |  |  |  | ◯ |
|  | hydrogenated nitrile rubber composition 3 |  |  |  |  |  |  |  |
|  | hydrogenated nitrile rubber composition 4 |  |  |  |  |  |  |  |
|  | hydrogenated nitrile rubber composition 5 |  |  |  |  |  |  |  |
|  | hydrogenated nitrile rubber composition 6 |  |  |  |  |  |  |  |
|  | hydrogenated nitrile rubber composition 7 |  |  |  |  |  |  |  |
|  | hydrogenated nitrile rubber composition 8 |  |  |  |  |  |  |  |
| Composition for forming adhesive | cresol modified novolac type phenol resin-containing composition (1) | ◯ |  |  |  |  |  |  |
|  | cresol modified novolac type phenol resin-containing composition (2) |  | ◯ | ◯ | ◯ | ◯ | ◯ | ◯ |
|  | cresol modified novolac type phenol resin-containing composition (3) |  |  |  |  |  |  |  |
|  | unmodified novolac type phenol resin-containing composition (1) |  |  |  |  |  |  |  |
|  | cresol modified novolac type phenol resin-containing composition (4) |  |  |  |  |  |  |  |
|  | cresol modified novolac type phenol resin-containing composition (5) |  |  |  |  |  |  |  |
|  | unmodified novolac type phenol resin-containing composition (2) |  |  |  |  |  |  |  |
|  | cresol modified novolac type phenol resin-containing composition (6) |  |  |  |  |  |  |  |
|  | cresol modified novolac type phenol-unmodified novolac type phenol resin mixture-containing composition |  |  |  |  |  |  |  |
| number of coating and heat treatment |  | 3 | 2 | 3 | 4 | 3 | 3 | 3 |
| conditions of final heat treatment |  | 120° C. × 15 min | 120° C. × 15 min | 120° C. × 15 min | 120° C. × 15 min | 100° C. × 15 min | 140° C. × 8 min | 120° C. × 15 min |
| thickness (μm) of adhesive layer |  | 13 | 3 | 15 | 30 | 16 | 15 | 17 |

|  |  | Example | | | | | | |
|---|---|---|---|---|---|---|---|---|
|  |  | 8 | 9 | 10 | 11 | 12 | 13 | 14 |
|  | hydrogenated nitrile rubber composition 1 |  |  |  |  |  |  | ◯ |
|  | hydrogenated nitrile rubber composition 2 |  |  |  |  |  |  |  |
|  | hydrogenated nitrile rubber composition 3 | ◯ |  |  |  |  |  |  |
|  | hydrogenated nitrile rubber composition 4 |  | ◯ |  |  |  |  |  |
|  | hydrogenated nitrile rubber composition 5 |  |  | ◯ |  |  |  |  |
|  | hydrogenated nitrile rubber composition 6 |  |  |  | ◯ |  |  |  |
|  | hydrogenated nitrile rubber composition 7 |  |  |  |  | ◯ |  |  |
|  | hydrogenated nitrile rubber composition 8 |  |  |  |  |  | ◯ |  |
| Composition for forming adhesive | cresol modified novolac type phenol resin-containing composition (1) |  |  |  |  |  |  |  |
|  | cresol modified novolac type phenol resin-containing composition (2) | ◯ | ◯ | ◯ | ◯ | ◯ | ◯ |  |
|  | cresol modified novolac type phenol resin-containing composition (3) |  |  |  |  |  |  |  |
|  | unmodified novolac type phenol resin-containing composition (1) |  |  |  |  |  |  |  |
|  | cresol modified novolac type phenol resin-containing composition (4) |  |  |  |  |  |  | ◯ |
|  | cresol modified novolac type phenol resin-containing composition (5) |  |  |  |  |  |  |  |
|  | unmodified novolac type phenol resin-containing composition (2) |  |  |  |  |  |  |  |

TABLE 1-continued

| | | | | | | | | |
|---|---|---|---|---|---|---|---|---|
| | cresol modified novolac type phenol resin-containing composition (6) | | | | | | | |
| | cresol modified novolac type phenol-unmodified novolac type phenol resin mixture-containing composition | | | | | | | |
| number of coating and heat treatment | | 3 | 3 | 3 | 3 | 3 | 3 | 3 |
| conditions of final heat treatment | | 120° C. × 15 min | 120° C. × 15 min | 120° C. × 15 min | 120° C. × 15 min | 120° C. × 15 min | 120° C. × 15 min | 120° C. × 15 min |
| thickness (μm) of adhesive layer | | 13 | 15 | 16 | 17 | 17 | 15 | 14 |

| | | Example | | | Comparative Example | | |
|---|---|---|---|---|---|---|---|
| | | 15 | 16 | 17 | 1 | 2 | 3 |
| | hydrogenated nitrile rubber composition 1 | ○ | ○ | ○ | ○ | ○ | ○ |
| | hydrogenated nitrile rubber composition 2 | | | | | | |
| | hydrogenated nitrile rubber composition 3 | | | | | | |
| | hydrogenated nitrile rubber composition 4 | | | | | | |
| | hydrogenated nitrile rubber composition 5 | | | | | | |
| | hydrogenated nitrile rubber composition 6 | | | | | | |
| | hydrogenated nitrile rubber composition 7 | | | | | | |
| | hydrogenated nitrile rubber composition 8 | | | | | | |
| Composition for forming adhesive | cresol modified novolac type phenol resin-containing composition (1) | | | | | | |
| | cresol modified novolac type phenol resin-containing composition (2) | | | | | | |
| | cresol modified novolac type phenol resin-containing composition (3) | | | | ○ | | |
| | unmodified novolac type phenol resin-containing composition (1) | | | | | ○ | |
| | cresol modified novolac type phenol resin-containing composition (4) | | | | | | |
| | cresol modified novolac type phenol resin-containing composition (5) | ○ | | | | | |
| | unmodified novolac type phenol resin-containing composition (2) | | ○ | | | | |
| | cresol modified novolac type phenol resin-containing composition (6) | | | | | | ○ |
| | cresol modified novolac type phenol-unmodified novolac type phenol resin mixture-containing composition | | | ○ | | | |
| number of coating and heat treatment | | 3 | 3 | 3 | 3 | 3 | 3 |
| conditions of final heat treatment | | 120° C. × 15 min | 120° C. × 15 min | 120° C. × 16 min | 120° C. × 15 min | 120° C. × 15 min | 120° C. × 15 min |
| thickness (μm) of adhesive layer | | 15 | 16 | 15 | 15 | 16 | 15 |

As a plate metal member, a 1 mm-thick cold rolled steel plate (25 mm×60 mm) treated with a zinc phosphate type coating film on its surface was used.

As a metal member for oil seal, a cylindrical metal part (outer circumferential diameter 24 mm, inner circumferential diameter 18 mm, height 6 mm) prepared by pressing a 0.8 mm-thick cold rolled steel plate and treated with a zinc phosphate type coating film on its surface was used.

The compositions for forming an adhesive shown in Table 1 comprise a novolac type phenol resin and hexamethylenetetramine as a curing agent. The content of hexamethylenetetramine in each composition for forming an adhesive is shown in Table 2. In addition, the melting point, the gelling time at 150° C. and the flow at 125° C. of the novolac type phenol resin contained in each composition for forming an adhesive were measured and are collectively shown in Table 2.

The melting point of the novolac type phenol resin was measured by the capillary tube method defined in JIS K 6910:2007 5.7, and the gelling time at 150° C. was measured by the "gelling time method C (automatic apparatus test tube method)" defined in JIS K 6910:2007 5.14.3. In addition, the flow at 125° C. was measured by method A defined in JIS K 6910:2007 5.11.1.

TABLE 2

| | Hexamethylene- | property of novolac type phenol resin | | |
|---|---|---|---|---|
| Composition for forming adhesive | tetramine content (mass %) | melting point (° C.) | gelling time (sec) at 150° C. | flow (mm) at 125° C. |
| cresol modified novolac type phenol resin containing composition (1) | 8 | 80-90 | 100 | 25-40 |
| cresol modified novolac type phenol resin containing composition (2) | 10 | 83-88 | 70 | 26-41 |
| cresol modified novolac type phenol resin containing composition (3) | 10 | 95-103 | 45 | 12-21 |

TABLE 2-continued

| Composition for forming adhesive | Hexamethylene-tetramine content (mass %) | property of novolac type phenol resin | | |
|---|---|---|---|---|
| | | melting point (° C.) | gelling time (sec) at 150° C. | flow (mm) at 125° C. |
| unmodified novolac type phenol resin-containing composition (1) | 10 | 88-98 | 40 | 20-35 |
| cresol modified novolac type phenol resin-containing composition (4) | 5 | 83-88 | 135 | 26-41 |
| cresol modified novolac type phenol resin-containing composition (5) | 15 | 83-88 | 52 | 26-41 |
| unmodified novolac type phenol resin-containing composition (2) | 7 | 88-98 | 60 | 20-35 |
| cresol modified novolac type phenol resin-containing composition (6) | 2 | 83-88 | 180 | 26-41 |
| cresol modified novolac type phenol-unmodified novolac type phenol resin mixture-containing composition | 10 | 84-98 | 65 | 24-45 |

The composition and ordinary physical properties of each hydrogenated nitrile rubber composition shown in Table 1 are shown in Table 3.

The amount of contained acrylonitrile, iodine value and Mooney viscosity of each hydrogenated nitrile rubber, and ordinary physical property of each hydrogenated nitrile rubber composition were respectively measured by the above-mentioned methods.

was performed after contacting the test piece with fluorohydrocarbon under the same conditions as the fluorohydrocarbon resistance test mentioned below.

(1) Rubber Residual Ratio in 90° Detaching Test

According to JIS K 6256-2:2006, a 90° detaching test was performed using a plate test piece.

After the detaching test, the area ratio (%) of the remaining hydrogenated nitrile rubber formed article relative to the

TABLE 3

| | | | hydrogenated nitrile rubber composition | | | | | | | |
|---|---|---|---|---|---|---|---|---|---|---|
| | | | 1 | 2 | 3 | 4 | 5 | 6 | 7 | 8 |
| component | | | Content (parts by mass) | | | | | | | |
| hydrogenated nitrile rubber 1 | contained acrylonitrile amount (mass %) | 36 | 100 | | | 100 | | 100 | 100 | 100 |
| | iodine value (g/100 g) | 11 | | | | | | | | |
| | Mooney viscosity [ML(1 + 4)100° C.] | 145 | | | | | | | | |
| hydrogenated nitrile rubber 2 | contained acrylonitrile amount (mass %) | 36 | | 100 | | | | | | |
| | iodine value (g/100 g) | 4 | | | | | | | | |
| | Mooney viscosity [ML(1 + 4)100° C.] | 85 | | | | | | | | |
| hydrogenated nitrile rubber 3 | contained acrylonitrile amount (mass %) | 36 | | | 100 | | | | | |
| | iodine value (g/100 g) | 28 | | | | | | | | |
| | Mooney viscosity [ML(1 + 4)100° C.] | 78 | | | | | | | | |
| hydrogenated nitrile rubber 4 | contained acrylonitrile amount (mass %) | 44 | | | | | 100 | | | |
| | iodine value (g/100 g) | 25 | | | | | | | | |
| | Mooney viscosity [ML(1 + 4)100° C.] | 75 | | | | | | | | |
| carbon black | FEF carbon black | | 60 | 60 | 60 | 60 | 60 | 45 | 45 | |
| | MT carbon black | | | | | | | 25 | 25 | |
| | HAF carbon black | | | | | | | | | 50 |
| plasticizer | trioctyltrimellitate | | 2 | 2 | 2 | 2 | 2 | 2 | 2 | 2 |
| crosslinking agent | 1,3-bis(t-butylperoxyisopropyl)benzene | | 3 | 3 | 3 | | 3 | 3 | | 3 |
| | 2,5-dimethyl-2,5-di(t-butylperoxy)hexane | | | | | 3 | | | 3 | |
| anti-aging agent | | | 1 | 1 | 1 | 1 | 1 | 1 | 1 | 1 |
| zinc oxide | | | 5 | 5 | 5 | 5 | 5 | 5 | 5 | 5 |
| ordinary physical property | Durometer hardness (Type A) | | 81 | 78 | 81 | 81 | 82 | 81 | 81 | 83 |
| | tensile strength (MPa) | | 33.8 | 26.4 | 30.4 | 35.0 | 30.6 | 30.0 | 29.8 | 35.8 |
| | elongation at break (%) | | 250 | 210 | 220 | 240 | 200 | 285 | 260 | 200 |

Each laminate of the above-mentioned Examples and Comparative Examples were respectively formed on a plate metal member and a metal member for oil seal to prepare plate test pieces and oil seal test pieces. Using these test pieces, the following tests were performed.

Experimental Example 1

Rubber Residual Ratio

To evaluate the stability of adhesiveness between a metal member and an adhesive in the laminate of the present invention, the test shown below was performed. This test surface of the metal member was visually estimated and taken as the rubber residual ratio in the 90° detaching test.

The above-mentioned rubber residual ratio of not less than 95% was pass (○) and less than 95% was failure (×).

(2) Rubber Residual Ratio in Picking Test (2-1) Picking Test of Plate Test Piece After the 90° detaching test of the above-mentioned (1), the hydrogenated nitrile rubber formed article remaining in the test piece was subjected to a picking test using nippers (diagonal nippers defined in JIS B 4625:1995). After the test, the ratio (%) of the area of the remaining hydrogenated nitrile rubber formed article that was not picked relative to the surface area of the metal member was visually estimated and taken as the rubber residual ratio in the picking test.

The results of Experimental Examples 1 and 2 are collectively shown in Table 4.

TABLE 4

| test item | | Example 1 | 2 | 3 | 4 | 5 | 6 | 7 | 8 | 9 | 10 | 11 | 12 | 13 | 14 | 15 | 16 | 17 | Comparative Example 1 | 2 | 3 |
|---|---|---|---|---|---|---|---|---|---|---|---|---|---|---|---|---|---|---|---|---|---|
| rubber residual ratio | 90° detaching test | ○ | ○ | ○ | ○ | ○ | ○ | ○ | ○ | ○ | ○ | ○ | ○ | ○ | ○ | ○ | ○ | ○ | ○ | ○ | x |
| | picking test | ○ | ○ | ○ | ○ | ○ | ○ | ○ | ○ | ○ | ○ | ○ | ○ | ○ | ○ | ○ | ○ | ○ | x | x | x |
| fluorohydrocarbon resistance (starting points) | Plate test piece | 0 | 0 | 0 | 0 | 0 | 0 | 0 | 0 | 0 | 2 | 0 | 0 | 0 | 0 | 0 | 0 | 0 | 0 | 0 | 5 |
| | Oil seal test piece top face | 0 | 0 | 0 | 0 | 1 | 1 | 0 | 0 | 0 | 2 | 0 | 0 | 0 | 1 | 0 | 1 | 1 | 2 | 5 | 8 |
| | Oil seal test piece lateral face | 1 | 2 | 0 | 1 | 2 | 3 | 2 | 2 | 1 | 3 | 2 | 1 | 0 | 2 | 2 | 2 | 2 | 6 | 8 | 12 |
| | Oil seal test piece total | 1 | 2 | 0 | 1 | 3 | 4 | 2 | 2 | 1 | 5 | 2 | 1 | 0 | 3 | 2 | 3 | 3 | 8 | 13 | 20 |

The above-mentioned rubber residual ratio of not less than 95% was pass (○) and less than 95% was failure (x).

(2-2) Picking Test of Oil Seal Test Piece

The hydrogenated nitrile rubber formed article on the surface of an oil seal was subjected to a picking test was performed using nippers (diagonal nippers defined in JIS B 4625:1995). After the test, the ratio (%) of the area of the remaining hydrogenated nitrile rubber formed article that was not picked relative to the surface area of the metal member was visually estimated and taken as the rubber residual ratio in the picking test.

The above-mentioned rubber residual ratio of not less than 95% was pass (○) and less than 95% was failure (x).

(2-3) As for the rubber residual ratio in the picking test, the above-mentioned test results of the plate test piece and the oil seal test piece were evaluated together, and a rubber residual ratio of not less than 95% in both tests was pass.

Experimental Example 2

Fluorohydrocarbon Resistance Test

In the laminate of the present invention, to evaluate adhesion stability in the both interfaces between an adhesive, and a metal member and a hydrogenated nitrile rubber when contacted with fluorohydrocarbon, the fluorohydrocarbon resistance was evaluated.

A plate test piece and an oil seal test piece were sealed in a pressure bottle filled with fluorohydrocarbon.(HFC134a), and left standing at 40° C. for 24 hr to allow contact with fluorohydrocarbon. The test pieces immediately after taken out from the aforementioned pressure bottle were arranged on a hot plate heated to 150° C. in advance, and left standing as they were in a thermostatic tank at 150° C. for 1 hr.

Then, the hydrogenated nitrile rubber formed article was removed from the plate test piece, and the starting points of blisters and cracks developed from near the both interfaces between the adhesive and the metal member and the hydrogenated nitrile rubber formed article as a starting point were counted. As for the oil seal test piece, the starting points of the aforementioned blisters and cracks on the top face and the lateral face of the oil seal were counted and the total number thereof was calculated.

A plate test piece having a total number of the blisters and cracks of 2 or less per 1250 $mm^2$ was pass. An oil seal having a total number of the blisters and cracks of or less per 650 $mm^2$ was pass.

As is clear from Table 4, the laminates of the Examples of the present invention showed good results in both the rubber residual ratio test and the fluorohydrocarbon resistance test.

On the other hand, the laminates of Comparative Examples 1 and 2, wherein the adhesive was formed using a composition containing a novolac type phenol resin having a gelling time at 150° C. of shorter than 50 sec, failed to meet the acceptance standard of the rubber residual ratio in the picking test, and were also shown to have insufficient fluorohydrocarbon resistance of the oil seal test piece. In addition, the laminate of Comparative Example 3, wherein the adhesive was formed using a composition containing a novolac type phenol resin having a gelling time at 150° C. of longer than 150 sec, failed to meet the acceptance standards of both the 90° detaching test and the picking test, and sufficient fluorohydrocarbon resistance was not found in either of the plate test piece and the oil seal test piece.

INDUSTRIAL APPLICABILITY

As described in detail above, according to the present invention, a laminate having superior fluorohydrocarbon resistance, which is capable of retaining extremely stable adhesiveness in each adhesive interface between a metal member and an adhesive, and between an adhesive and a hydrogenated nitrile rubber formed article, and is particularly suitable for use as a sealing member such as oil seal, gasket and the like to be used at a harsh site and under harsh conditions (e.g., high temperature and the like) such as cooling apparatuses of air conditioning machines and freezing machines, and compressor of air conditioning apparatuses and the like for vehicles such as automobile and the like can be provided.

This application is based on a patent application No. 2013-037910 filed in Japan, the contents of which are incorporated in full herein.

The invention claimed is:

1. A laminate comprising a metal member, and an adhesive and a hydrogenated nitrile rubber formed article laminated on the metal member, wherein the adhesive is formed from a cured product of a composition comprising a resin containing not less than 90 mass % of a novolac type phenol resin having a gelling time, as measured by Japanese Industrial standard (JIS) K 6910:2007 "gelling time C method", of 50 sec-150 sec at 150° C., and a curing agent, wherein the hydrogenated nitrile rubber formed article is a formed article of a rubber composition containing a hydrogenated nitrile rubber having a contained acrylonitrile amount of 30 mass %-45 mass %, an iodine value of 4 g/100 g-30 g/100 g, and a Mooney viscosity [ML(1+4)100° C.] of 70-150.

2. The laminate according to claim 1, wherein the novolac type phenol resin comprises not less than 80 mass % of a cresol modified novolac type phenol resin.

3. The laminate according to claim 1, wherein the content of the curing agent is 5 parts by mass-30 parts by mass per 100 parts by mass of the novolac type phenol resin.

4. The laminate according to claim 1, wherein the adhesive laminated on the metal member has a thickness of 1 µm-30 µm.

5. A sealing member comprising the laminate according to claim 1.

6. The sealing member according to claim 5, which is a gasket.

7. The sealing member according to claim 5, which is an oil seal.

8. The sealing member according to claim 5, which is used for an air conditioning machine or freezing machine for a vehicle.

9. The laminate according to claim 1, wherein the laminate is used for a part to be in contact with a fluorohydrocarbon.

* * * * *